United States Patent [19]
Drummond

[11] Patent Number: 4,562,529
[45] Date of Patent: Dec. 31, 1985

[54] CONTROL OF REAL TIME INDUSTRIAL PROCESSES

[75] Inventor: Andrew F. Drummond, Wimborne, England

[73] Assignee: Programasyst Limited, Bournemouth, United Kingdom

[21] Appl. No.: 666,766

[22] Filed: Oct. 31, 1984

Related U.S. Application Data

[63] Continuation-in-part of Ser. No. 417,120, Sep. 1, 1982, abandoned.

[51] Int. Cl.$^4$ ............................................. G06F 15/46
[52] U.S. Cl. .................... 364/140; 364/148; 364/477; 364/141
[58] Field of Search ................................ 364/140–147, 364/148, 505, 477

[56] References Cited

U.S. PATENT DOCUMENTS

| | | | |
|---|---|---|---|
| 3,204,087 | 8/1965 | Millis, Jr. | 364/141 |
| 3,334,334 | 8/1967 | Halpin | 364/141 X |
| 3,414,884 | 12/1968 | Jensen | 364/141 X |
| 4,129,901 | 12/1978 | Masuda | 364/141 |
| 4,142,246 | 2/1979 | Fumihiko et al. | 364/141 X |

OTHER PUBLICATIONS

Harlow et al.,—"Feedback in Sequential Machine Realizations"—IEEE Trans. on Computers—vol. C-21, No. 4, Apr. 1972, pp. 371–381.

*Primary Examiner*—Joseph Ruggiero
*Attorney, Agent, or Firm*—Lowe, King, Price & Becker

[57] ABSTRACT

A control method and apparatus (30) for controlling a real time industrial process of which the operation can be defined by a set of P logical statements of the form $$STATE_{(N)} \text{ AND } OMI_{(N,M)} = STATE_{(M)}$$

where
N and M may have any integral value up to P,
N does not equal M,
$STATE_{(N)}$, $OMI_{(N,M)}$, and $STATE_{(M)}$ are all logical variables, and
$OMI_{(N,M)}$ is the conjunctive OPERATING MODE INCREMENT that is necessary to the progress of the process from $STATE_{(N)}$ to $STATE_{(M)}$,
and in which set only one such STATE variable at a time can be recognized as having the value TRUE.

In the method and apparatus the following steps are performed:

(i) evaluating in turn each successive STATE in at least a group of said STATES in the set on the basis of feedback data relating to current values of various relevant parameters of the process and the current TRUE STATE, by (a) determining the logical value of the preceding STATE or STATES on which said STATE is dependent, (b) determining the logical value of the or each OPERATING MODE INCREMENT on which said STATE is dependent, and (c) evaluating the logical statement defining said STATE, using the logical values just determined for the or each preceding STATE and the associated OPERATING MODE INCREMENT to determine the logical value of said STATE; and (ii) initiating any relevant and necessary control action on finding a STATE having the logical value TRUE.

21 Claims, 4 Drawing Figures

CONTROL OF REAL TIME INDUSTRIAL PROCESSES

This application is a continuation-in-part of U.S. patent application Ser. No. 417,120, filed Sept. 1, 1982, abandoned.

This invention relates to the control of, and means for controlling, in real time the course of an industrial process, or any other form of controllable technical activity, such as for example a real time simulation of such industrial process.

In prior art process control arrangements, current values of input signals derived from sensing/feedback devices have been sensed and compared with previously stored (or predefined and stored) values. When some predefined relationship has been found to exist between current and stored values, some predetermined control action has been taken, after reference for example to look-up tables (as in the case of the cited patent specifications Nos. FR-A-2 321 722, CIBIE), or to decision tables (as in the case of the cited patent specification DE-A-2 714 069, INSURANCE TECHNICAL BUREAU). The use of such tables constitutes an inefficient way of performing the task in hand. In the CIBIE specification, the control system there referred to is of the deterministic variety, the particular example given being a system for controlling a machine tool. For control systems using other than such deterministic approach, the adoption of the control techniques disclosed in the CIBIE specification would result in control arrangements that are cumbersome to the point of being impractical.

In a programmable industrial process control system disclosed in DATENVERARBEITUNG AEG-TELEFUNKEN 7 (1975) 2/3 at pages 54 to 57, a language written for control engineers is used. As is common to all control systems, relationships are built up in that control system between the input statuses (e.g. "on" or "of") and the outputs. Those relationships are built up in a "control step" (LINK-AKT-AKF), which is essentially of the form "IF-THEN-ELSE-ENDIF", which form is widely used in structured high-level languages. The "link" part, VK, which is equivalent to the IF section, contains the logic conditions which are to be examined by the control processor, and may yield the result 'TRUE' or alternatively 'FALSE'. The "action" part if further divided into two parts: (a) AKT which corresponds to the THEN structure and is actioned if the link part VK is TRUE, and (b) AKF which corresponds to the ELSE structure, which is actioned if the link part is FALSE. These action routines AKT and AKF are supplied by the supplier of the control processor to the User, who enters them into his program, using the supplier's mnemonics. This feature places undesirable constraints on the process control designer in performing his task.

The "Control Step List" (STEUERSCHRITT-LISTE) described is a program consisting simply of a list of "LINK-AKT-AKF" statements. New actions can be triggered only if the logical result of the LINK part changes (i.e. the "status" changes). The LINK part can change only if change occurs in one or some of the operands processed in the LINK part. Change can only occur in the operands as a result of change in the input(s) to the controller. Paragraph 3.3 of this disclosure explains how these input changes are 'noticed' by the control processor; namely, input signal statuses are repeatedly read in on a cyclic basis and compared to their previous (stored) values.

Only Boolean operations AND, OR, NOT are allowed in the LINK part, and this indicates that this prior art system is no more than a solid-state (computer) version of the traditional relay-logic controller.

The present invention seeks to provide a control method and system that does not have the disadvantage referred to above, and that is more readily and freely used by the process control designer.

In what follows, the totality of apparatus (including the means for exercising such real time control) for performing the process or activity will be referred to as the system, and such process or activity will be referred to simply as an "industrial process" or more simply as a "process".

The following preliminary explanation will assist the reader in fully comprehending the nature of the invention that is described later in this specification.

In carrying on such a process, the system proceeds in real time from one specific operating condition or state in which it is ready for any relevant and necessary next control action to be initiated, to a next such operating state, which next state will be achieved, consequent upon the initiation of a said control action, or upon the occurrence of some other disturbance or variation in the system, only after the occurrence of a specific change or increment in the operating mode of the system. By 'operating mode' is meant the combination of the instantaneously prevailing values or conditions of the various parameters (i.e. process variables) that are influential in determining the future course of operation of the system and such meaning applies throughout this Specification and Claims.

By the "operating state" of a process is meant the combination of all of the conditions instantaneously prevailing throughout the process and such meaning applies throughout this Specification and Claims.

A means (hereinafter referred to as "the controller") for exercising control of such a process or activity must therefore include means for discerning the attainment of each such next operating state, and for this purpose said controller must be kept informed of variations in the values (the word "value" is used throughout in this Specification to include the meaning of the word "status") of all of the system parameters that influence, or are influenced by, the course of said process. Hence, the system must also include feedback means for feeding back to said controller data representing the values of all said parameters.

Moreover, a said controller has inherently within itself, i.e. by virtue of its present condition, some information concerning the immediate past history of the process, which information can be used by the controller in determining in conjunction with said feedback data a future course of action for further advancing the process in a desired manner.

In the analysis of any process to be controlled by such a controller, certain process operating states may be recognised, or selected, as being separately identifiable, desirable or essential specific operating states some or all of which will be attained in the course of carrying out the process. Such operating states are selectable in advance, each one being analagous to each of one or more corresponding members of a set of logical binary variables, each such variable being identified in what follows by the notation STATE.

Moreover, the operating mode increment necessary for the system to attain a next such STATE from its preceding such STATE is definable in advance, and its existence or not can be represented by a logical binary variable which variable will be represented in what follows by the notation OMI.

Each STATE has two (and only two) alternative logical values (TRUE, FALSE).

Each OMI has two (and only two) alternative values (TRUE, FALSE).

Hence, it will be appreciated and understood that a STATE is a logical (i.e. binary) variable, and that likewise an OMI is a logical (i.e. binary) variable Thus, each STATE can be represented in terms of the preceding STATE and the conjunctive OMI that differentiates such STATE over said preceding STATE.

For any system as aforesaid, the operation of the system can be fully represented in advance as a network of STATES linked by associated OMIs.

In what follows, all of the STATES defined for a given system will be referred to as constituting a set of STATES for the system. Such a set of STATES can be represented in a STATE diagram for the system, as will be shown and described later.

At any given time, such a system can exist in any one (and one only) state. Each such state is either existent or non-existent and is uniquely associated with a defined STATE. During such times as the state exists its associated STATE can be represented by the logical value TRUE. Whereas during such times as the state does not exist its associated STATE can be represented by the logical value FALSE. At any given time only one such STATE in the set can be represented by the logical value TRUE, all the other STATES of the set being represented by the logical value FALSE.

Likewise, an OMI that distinguishes one STATE from the next has either been achieved, or not achieved, so that the OMI can likewise be represented by the alternative logical values TRUE and FALSE.

Whereas in the prior art control systems referred to above, the control methods have included the steps of:

(A) deriving feedback data relating to current values of various relevant parameters of a said process;

(B) assessing said feedback data cyclically and detecting therefrom a need, according to a predetermined operating plan, for a change in a process control parameter value; and (C) initiating in response to the detection of any such need any necessary and relevant control action, according to one aspect of the present invention, in a method of controlling an industrial process for which a multiplicity of "operating states" of the process are separately identifiable (each said operating state being a combination of all the control conditions instantaneously prevailing throughout the process), said step (B) referred to above comprises the steps of:

(a) representing each one of said multiplicity of said operating states in a control apparatus by a corresponding logical variable of a "set" of such variables, in which set the multiplicity of members of the set is equal to at least the said multiplicity of said operating states;

(b) causing the variables of said set to comply in said apparatus with the rules that:

(i) one, and only one member of the set can have value TRUE at any one time, all others inherently then having the value FALSE;

(ii) any other member of said set can as required for control of the controlled process be the next succeeding member to take the value TRUE; and (iii) no member of said set may take the value FALSE except as a consequence of another member of the set taking value TRUE;

(c) maintaining a correspondence between said separately identifiable operating states of the process and the logical values of the corresponding members of said set in said control apparatus by detecting from feedback data or otherwise the occurrence of the required conditions appertaining to the change of operating state of the process from one current, operating state to another operating state and accordingly causing the said variable representing the said another operating state to take the value TRUE, the variable representing said one operating state thereupon automatically reverting to the value FALSE; and (d) initiating in said control apparatus any necessary and relevant control action consequent upon the setting to the value TRUE of said logical variable representing said another operating state; representation of the operation of said process in said control apparatus progressing from the member of said set which is currently TRUE directly to any other member of the set as appropriate upon detecting the occurrence of the required conditions appertaining to the relevant change of operating state of the process.

Furthermore:

whereas in the prior art control systems referred to above, the control apparatus has included:

(A) means for deriving feedback data relating to current values of various relevant parameters of a said process;

(B) means for assessing said feedback data cyclically and detecting therefrom a need, according to a predetermined operating plan, for a change in a process control parameter value; and (C) means for initiating in response to the detection of any such need any necessary and relevant control action, according to a further aspect of the present invention, in an apparatus for controlling an industrial process for which a multiplicity of "operating states" of the process are separately identifiable (each said operating state being a combination of all the control conditions instantaneously prevailing throughout the process), said means (B) referred to above comprises:

(a) means for representing each one of said multiplicity of said operating states by a corresponding logical variable of a "set" of such variables, in which set the multiplicity of members of the set is equal to at least the said multiplicity of said operating states, said means being constructed and arranged such that the variables of said set comply with the rules that:

(i) one, and only one, member of the set can have the value TRUE at any one time, all others inherently then having the value FALSE;

(ii) any other member of said set can as required for control of the controlled process be the next succeeding member to take the value TRUE; and (iii) no member of said set may take the value FALSE except as a consequence of another member of the set taking value TRUE;

(b) means for maintaining a correspondence between said separately identifiable operating states of the process and the logical values of the corresponding members of said set by detecting, from current value data relating to various relevant parameters of the controlled process as provided by respective feedback devices or otherwise, the occurrence of the required conditions appertaining to the change of operating state of the process from one current operating state to another operating state and accordingly causing the said variable representing the said another operating state in said representing means to take the value TRUE, whereupon the variable representing said one operating state in said representing means automatically reverts to the value FALSE; and (c) means responsive to a said variable newly taking the value TRUE for providing in response thereto output control signals for in initiating any necessary and relevant control action by said control apparatus consequent upon setting to the value TRUE said logical variable representing said another operating state; representation of the operation of said process in said representing means progressing from the member of said set which is currently TRUE directly to any othe member of the set as appropriate upon detecting the occurrence of the required conditions appertaining to the relevant change of operating state of the process.

It is a characteristic of the processes and systems with which the present invention is concerned that the order in which the process or system will proceed from one operating state to another, and therefore the order in which the system will proceed from one STATE as previously defined to another, cannot be predicted, since some operating states can be achieved by progress from any one of a multiplicity of other operating states. This characteristic will be discerned from the embodiments described later in this Specification.

Systems embodying the present invention have the technical advantage that if 'n' input signals derived from sensing/feedback devices are continually sensed, there is a need to process only those input signals (the number of which will be less than or equal to 'n', and in practice will be only one or two) which have been previously defined as being relevant to transfers between the current "process operating state" and the "process operating state or states" to which it has been determined by design that the process may proceed. Upon the advent of predetermined values of those processed input signals, the process is controlled to depart from that process operating state that is related to the state logical variable having the value TRUE immediately prior to such advent, and to enter the process operating state related to the state logical variable which is allowed to take the value TRUE upon such advent.

It is in the identification and representation of each process operating state in the control means by a uniquely related STATE logical variable, and in the manipulation by the control means of such STATE variables in logical relationships, which jointly constitute the novel control regime, that the principal inventive significance of the present invention lies.

By way of contrast, prior art systems having 'n' such sensed input signals have had to process much larger numbers of n combinations (up to and including 2 combinations) of such input signals, with the attendant serious disadvantages of, for example, wasteful use of processing time and a corresponding larger need for storage of data.

Moreover, the supervisor of an industrial process controlled by a method of apparatus according to the present invention can ascertain quickly and at any time the operating state of the process by ascertaining which of said STATE logical variables currently has the value TRUE. No such facility exists or is possible with any of the prior art arrangements.

In this specification, the words "logical statements" are used throughout to mean "logical statements of assignment".

The present invention greatly facilitates the efficient and expeditious execution of control for real time processes (as hereinbefore defined); this is particularly significant when such processes are being controlled by means of micro-processors.

The methods and apparatuses of the present invention may also be used in the simulation of various processes and activities of the various kinds referred to in this Specification.

Other features and advantages of the present invention will appear from the following description, and from the claims appended at the end of that description.

One electric control system embodying the present invention, for controlling the operation of a coal-fired furnace will now be described by way of example, and with reference to the accompanying drawings, in which.

Figure 1:
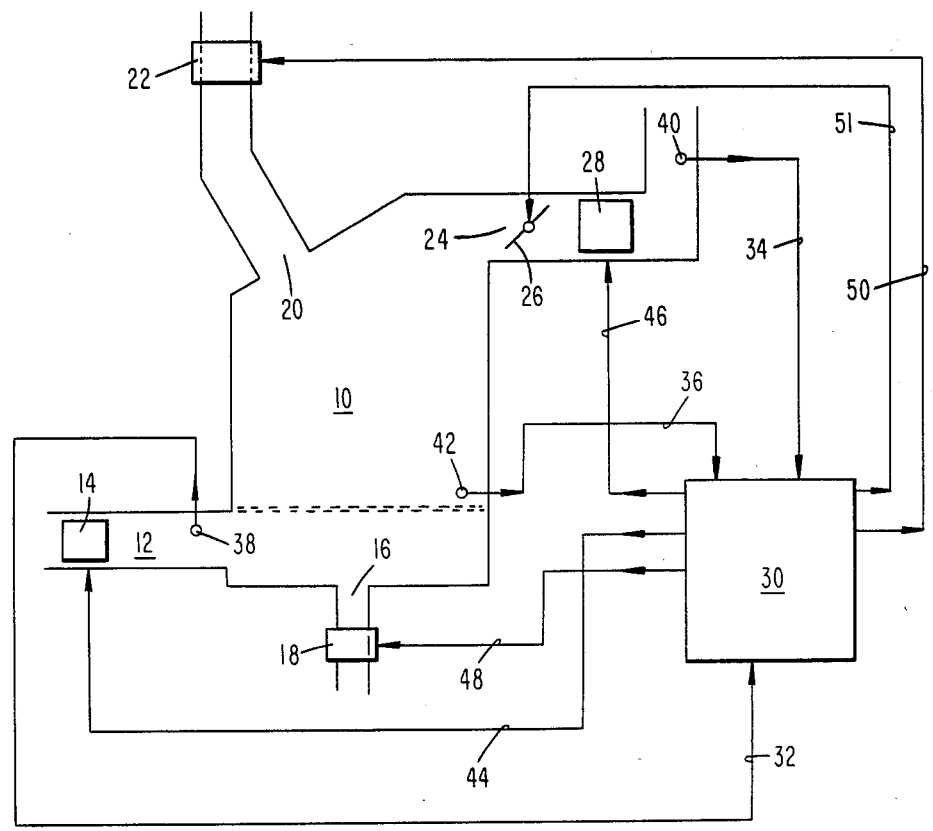
FIG. 1 is a schematic diagram showing the general arrangement of the furnace and its associated control apparatus.

Referring now to FIG. 1, the furnace to be controlled has a furnace chamber 10 having an air inlet duct 12 housing a forced draught fan 14, a gas inlet duct 16 controlled by an electrically-controlled on/off valve 18, a coal inlet duct 20 controlled by an electrically-controlled on/off valve 22, and a smoke exit duct 24 incorporating an electrically-controlled damper 26 and an induced draught fan 28.

An electrical control apparatus 30 receives electrical feedback signals via lines 32, 34 and 36 from the following devices:

(a) a first fan-running (ON) sensing device 38 in the air inlet duct 12;

(b) a second fan-running (ON) sensing device 40 in the smoke outlet duct 24; and (c) a temperature sensor 42 located in the fire bed of the furnace chamber.

The electrical control apparatus 30 delivers control action-initiating signals via lines 44, 46, 50 and 51 to the following devices:

(a) the forced draught fan 14;
(b) the induced draught fan 28;
(c) the gas control valve 18;
(d) the coal control valve 22; and
(e) the damper 26.

Figure 2:
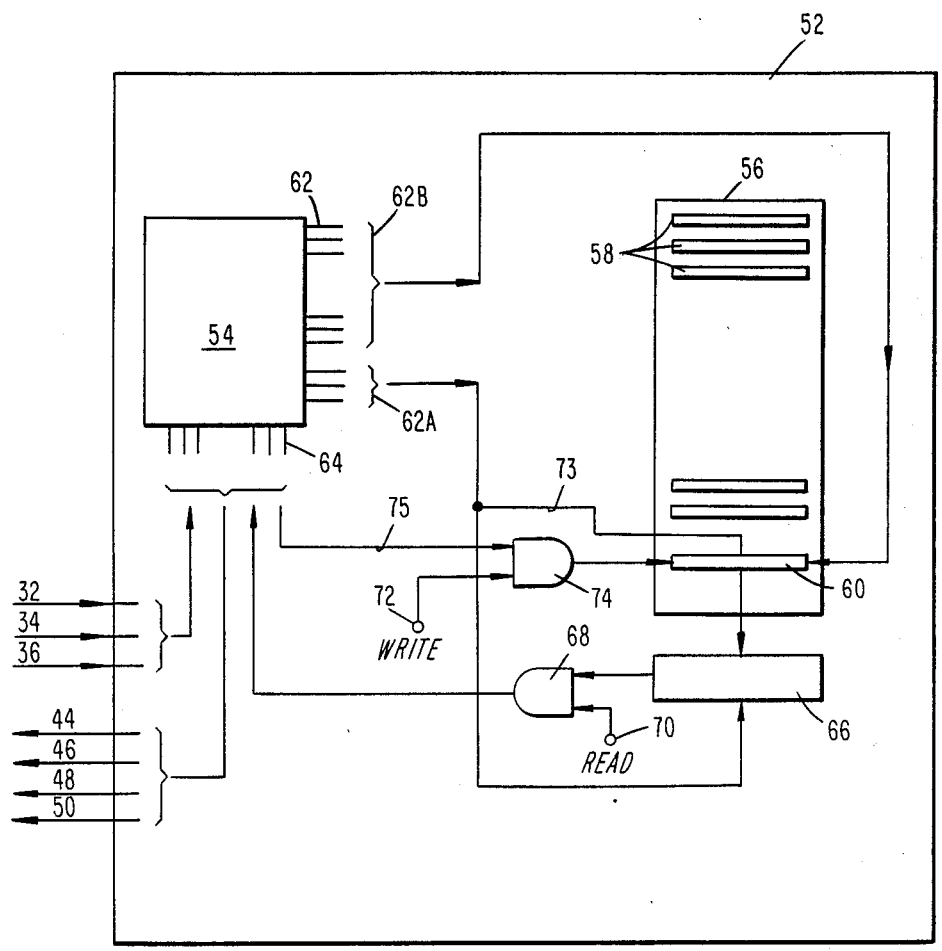
FIG. 2 is a schematic diagram showing part of said control apparatus of FIG. 1.

The electrical control apparatus 30 incorporates, as shown in FIG. 2, a controller 52 which comprises essentially a micro-processor 54 (constituting a central processor unit), and an associated memory unit 56 having in addition to a normal series of addressable storage locations 58 for use in normal data processing activities of the processor, a single dedicated addressable storage location 60 which is intended to fulfil a special function that will be explained later in the Specification.

The processor 54 has a set of parallel address lines 62 for selecting in accordance with program instructions the respective storage locations 58 as required, for use in normal data processing activities, and a set of parallel data lines 64 for transferring data between the processor 54 and the memory unit 56.

The controller 52 also incorporates a comparator 66 which is arranged, on receipt of an appropriate program instruction, to compare a storage location address then stored in the dedicated storage location 60 with another storage location address then supplied to it by a small group 62A (of three) of the address lines 62, the other group 62B of the address lines 62 being used to select (or enable) the dedicated storage location whereby to enable it to deliver its contents to the comparator 66.

The storage location addresses compared in the comparator are preferably (and advantageously) addresses, allocated to the respective STATES, of hypothetical storage locations constituting an hypothetical extension of the memory unit 56. The expression hypothetical storage arises from the following.

Because of the separation of the address lines 62, of FIG. 2, into two groups 62A and 62B for performing different functions, some of the combinations of signals which appear on the address lines 62 do not form unique addresses of locations within real memory unit 56, these combinations are said to address locations in hypothetical storage.

An output signal (TRUE/FALSE) from the comparator 66 is supplied through an AND gate 68 to the data lines 64 of the processor 54 when an input control signal (READ) is supplied by the processor to a second input circuit 70 of that gate.

The address stored in the dedicated storage location 60 may be changed to the address then present at the address line group 62A by the application of a control pulse (WRITE) to a control input circuit 72 of an AND gate 74 connected between the data lines 64 of the processor 54 and the WRITE-ENABLE input of the dedicated storage location 60, so that the AND gate 74 is enabled only when the data lines 64 indicate via a second input circuit 75 of that gate the logical value TRUE for the STATE just evaluated.

Figure 3:
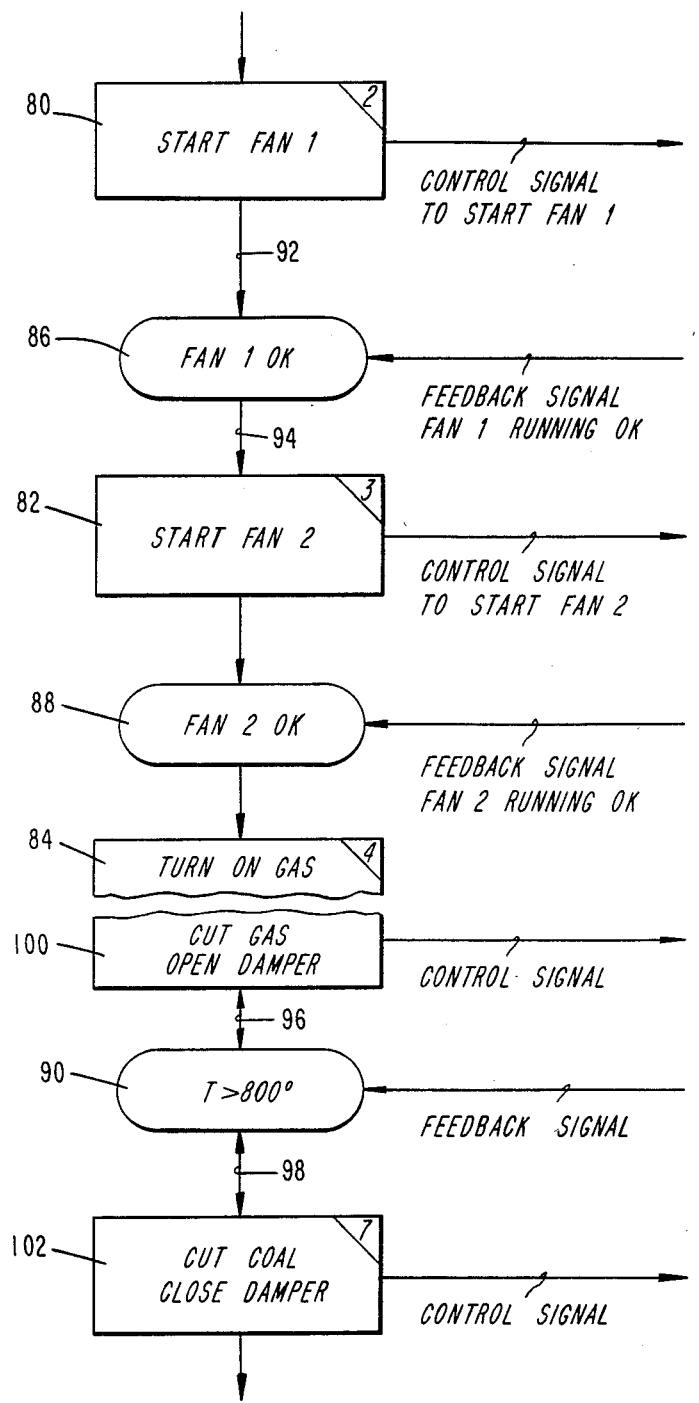
FIG. 3 is a block diagram showing a typical sequence of STATES and OMIs that is met in controlling a real time process or other activity.

Referring now to the FIG. 3, there is schematically illustrated there the matters mentioned in the introductory paragraphs of this Specification. In the rectangular boxes 80, 82, 84, etc. are typical STATES (e.g. for the furnace control system), box 80 being the STATE for starting a first fan, and box 82 being the STATE for starting a second fan. These boxes are shown as giving rise (at their right-hand sides) to the emission of the necessary control signals (and in some cases indicating signals) to cause the control sequence to progress further, in the case of box 80, for example, by causing fan 1 to be started.

In between the boxes 80, 82, 84, etc. are indicated the necessary OMIs that have to occur for the system to reach the respective next STATES. These increments are shown in round-ended envelopes 86, 88, 90 to which at their right-hand sides are pointed arrows representing the feedback data that have to be generated in order to cause their OMIs to take the value TRUE.

Single-headed arrows (typically 92, 94) proceeding down the paper from one STATE to another via an associated OMI indicate the direction (i.e. forward direction) in which the control sequence is capable of progressing between those STATES. Two-headed arrows (typically 96, 98) indicate that the process may progress in either direction between the relevant two STATES, e.g. 100 and 102.

In each of the STATE boxes 80, 82, 84, etc. the statement there appearing is abbreviated to indicate merely the control action associated with the relevant STATE.

In each of the intervening envelopes 86, 88 and 90 the statement there appearing indicates the OMI which must be TRUE before the system, as seen by the control apparatus 30, changes from its current STATE to the next STATE.

Each STATE box bears in its upper right-hand corner the identity number of that STATE.

For any system, the operation of that system can be represented by a STATE diagram comprising the various successive STATES and OPERATING MODE INCREMENTS that are experienced during operation of this system. The sequence of STATES and OPERATING MODE INCREMENTS can close upon itself to form a loop, and there may also be subsidiary loops within the main loop.

For convenience, such a STATE diagram may omit some or all of the indications of the control signals that have to be emitted, and the feedback data that have to be received.

Such a STATE diagram will result from an analysis of a process or activity to be controlled.

From the STATE diagram it will be appreciated that, since each STATE is analogous to an operating state of the process, the STATE diagram, in depicting the paths between STATES also represents the paths between the analogous operating states. That is to say, the paths in the STATE diagram represent the only control paths which the process is permitted to follow, such control paths lying at all times between the only operating states in which the process is permitted to exist.

Figure 4:
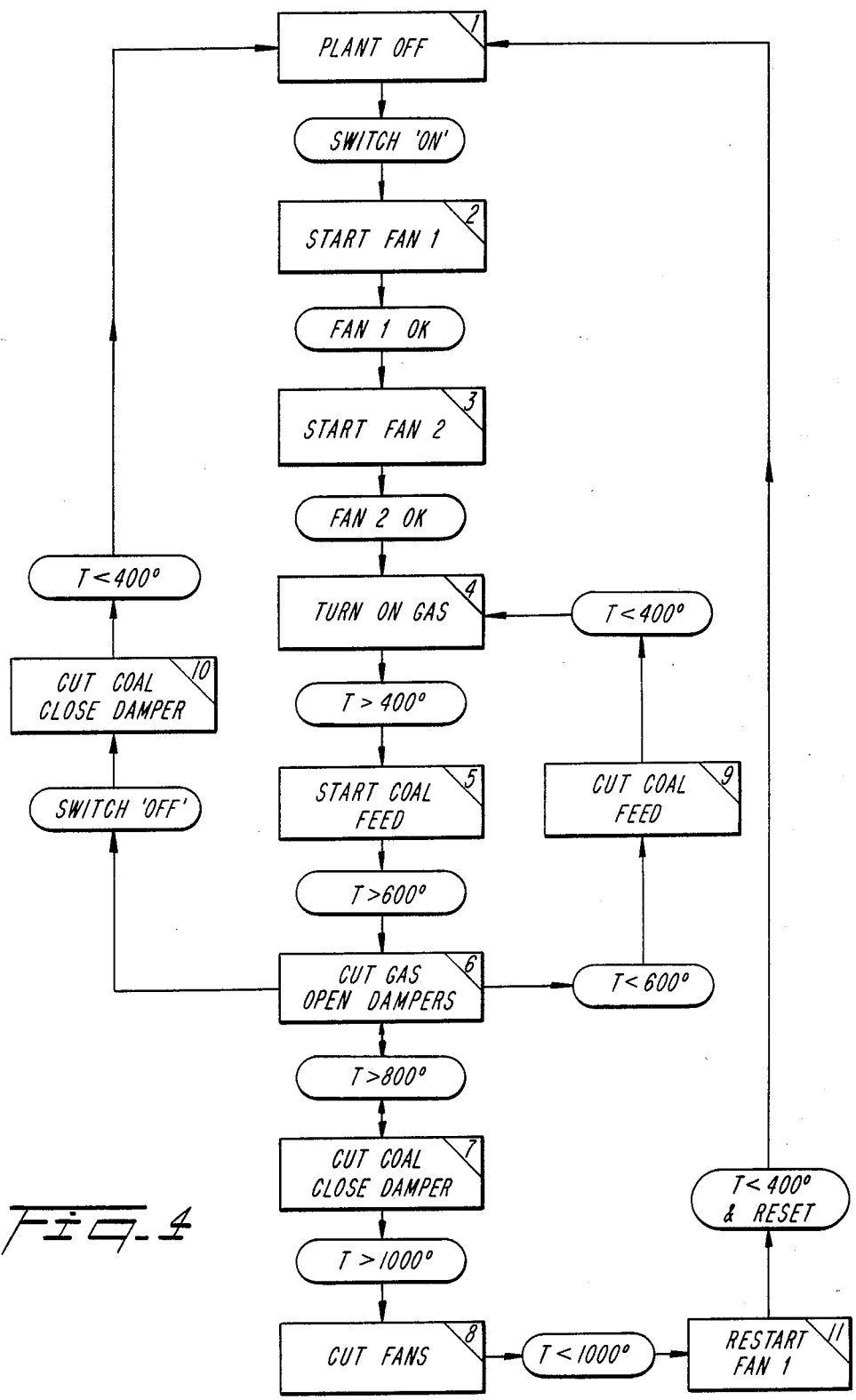
FIG. 4 is a comprehensive STATE diagram showing a complete sequence of STATES and OMIs in a process of controlling combustion in the said furnace.

Referring now to the FIG. 4, the STATE diagram for operating the furnace shown in the FIGS. 1 and 2 in the desired way is set out there. The furnace is intended, in its normal operation, to be fired with coal, control of the combustion process being achieved by control of the air supplied to the furnace chamber, by means of damper control and if necessary by fan control. However, to start the furnace, gas is supplied to the furnace chamber until the furnace fire bed has achieved a temperature sufficient to ignite coal. Thereupon the coal supply to the furnace chamber is initiated, and later, on the achievement of a still higher fire bed temperature, the gas supply is cut off.

It is believed that this STATE diagram will be self-explanatory in the light of the explanation given above with reference to the FIG. 3, though mention should be made here of the first STATE in the diagram.

This is a STATE of readiness for switching on the system and starting the process. Though for convenience and clarity, that STATE is designated as 'PLANT OFF', it could be marked alternatively as 'START SYSTEM'.

The logical statements describing the operation of the system may be expressed in a FORTRAN-LIKE programming language as follows:
ST1=(ST10.OR.(ST11.AND.RESET)).AND.(T.LT.400)
ST2=ST1.AND.ON
ST3=ST2.AND.FAN1OK
ST4=(ST3.AND.FAN2OK).OR.(ST9.AND.(T.LT.400))

ST5=ST4.AND.(T.GT.400)
ST6=(ST5.AND.(T.GT.600)).OR.(ST-7.AND.(T.LT.800))
ST7=ST6.AND.(T.GT.800)
ST8=ST7.AND.(T.GT.1000)
ST9=ST6.AND.(T.LT.600)
ST10=ST6.AND.NOT.ON
ST11=ST8.AND.(T.LT.1000)
Where the following items have the following meaning:
ST1 means STATE 1
T means TEMPERATURE
LT means LESS THAN
FAN1OK means FAN 1 RUNNING O.K.
GT means GREATER THAN The conditions for the operation of the various control elements (fans, control valves and dampers) are given by the logical statements:
FAN1=.NOT.(ST1.OR.ST8)
FAN2=.NOT.(ST1.OR.ST8.OR.ST11)
GAS=ST4.OR.ST5
COAL=ST5.OR.ST6
DAMPR=ST6

The processor is provided with an operating program which, inter alia, causes the processor to cyclically evaluate (typically 30 times per second) the expression of each statement of the above group of eleven logical statements, whereby to determine which STATE currently has a TRUE value, and upon assigning a change in the STATE having a TRUE value, to update a dedicated storage location (e.g. 60) which is so called because it is dedicated to storing ONLY the identity of the STATE currently having the TRUE value, and to emit appropriate control signals for controlling the operation of the process being controlled.

As an example of how the processor may operate, reference will be made to FIG. 2. The processor operates to store in the dedicated storage location 60 at all times the identity of the STATE most recently determined by the processor to have the TRUE value. This is achieved in the following manner.

After evaluating (see later for a description of the evaluation process) the logical value of the expression STATE$_{(N)}$ AND OMI$_{(N,M)}$ the processor applies (a) UNIT binary signals to each of the address lines 62 in the set 62B whereby to enable the dedicated storage location 60 in readiness for possible modification of its contents, (b) signals corresponding to the identity of the STATE$_{(M)}$ to the data input 73 of storage location 60, (c) a WRITE pulse to one input 72 of the AND GATE 74, and (d) a control signal to the other input 75 of AND GATE 74, which signal is TRUE if the expression just evaluated has been found to be TRUE, or likewise FALSE if the expression just evaluated has been found to be FALSE.

If the expression just evaluated has been found to be TRUE, the AND GATE 74 allows the WRITE PULSE applied at input 72 to be fed to the WRITE ENABLE input of storage location 60 thus causing the STATE$_{(M)}$ identity appearing on lines 62A to be written into that storage location as the new, currently TRUE STATE identity. If, however, the expression just evaluated has been found to be FALSE, no such WRITE PULSE will be fed to the storage location 60, so that its contents will remain unchanged. In this latter case the identity of the currently TRUE STATE will remain unchanged.

As mentioned earlier, the identity of ANY STATE may be the absolute (i.e. actual) identity of the STATE, (e.g. STATE 6), though preferably it is the address of an hypothetical storage location in an hypothetical extension of the memory unit 56, which hypothetical storage location has been allocated to that STATE.

In the latter case, the needs of the system are satisfied expeditiously and efficiently without having to use extra storage locations in the memory unit 56 and extra processing time accessing the actual identity.

To evaluate the logical value of the expression STATE$_{(N)}$ AND OMI$_{(N,M)}$ the logical value of the (or each) STATE$_{(N)}$ in the relevant expression is determined by applying the identity of that particular STATE$_{(N)}$ to the group 62A of the address lines and enabling the dedicated storage location 60 via the group 62B of the address lines thereby to compare in the comparator 66 that identity with the identity currently stored in the dedicated storage location 60. If the two identities are the same, the comparator transmits a TRUE signal back to the processor, which thereupon uses that TRUE signal to assign the logical value TRUE to STATE$_{(M)}$ always assuming that the values of all other terms of the expression have been found to be TRUE by conventional means. If on the other hand, the said two identities are different, the comparator transmits a FALSE signal back to the processor, which thereupon uses that FALSE value in the storage process described above.

The said operating program for the processor also causes the processor to evaluate the expressions of the above five logical statements (FAN1, FAN2, etc.) which determine when the respective control elements should be activated or maintained activated, and to emit appropriate control signals for effecting a desired control of the respective control elements.

Summarizing the operation of the processor, the processor operates to determine the logical value of a STATE, say STATE 8 in the furnace example above, in the following manner:

(a) it determines the logical value of STATE 7 by comparing the address (as defined by the group 62A of address lines) with the address in the dedicated storage location 60. If the addresses are equal, STATE 7 has the value TRUE, otherwise it has the value FALSE. This information is transmitted back to the processor via the data lines 64;

(b) the processor then determines the logical value of the associated OMI (in this example (T.GT.1000)) and logically combines (i.e. ANDs) it with the returned value of STATE 7 to ascertain the value of the expression;

(c) if the expression has the value TRUE, the processor thereupon emits a WRITE signal to cause the address of STATE 8 to be stored in the dedicated storage location 60 in place of the former stored STATE address.

Though in the system described above hardware has been used to enable the said comparisons and the changing and storing of the STATE currently having the value TRUE, equivalent software means may be used if desired as will appear from what follows:

1. For use with an "INTEL 8080" micro-processor, it is assumed that the A register will hold the logical value of the STATE, and that the H and L registers will hold the STATE and set selection numbers, (this assumes that the processor is intended to handle two or more independent sets of STATE variables for operating different process controls simultaneously).

It is also assumed that 256 (i.e. $2^8$) STATES are possible in each of 16 (i.e. $2^4$) possible sets.

The program runs as follows:

```
                        READ:
ENTRY POINT: MOV A, L;  L = STATE NUMBER
             MOV L, H;  Now L = SET NUMBER
             MVI H, 10; HL ADDRESSES 1000H +
                      ; SET NO
             CMP M;     COMPARE STATE
                      ; STORED WITH
                      ; STATE INTERROGATED
             MVI A, O; SET A = FALSE
             RNZ;       RETURN IF COMPARISON
                      ; UNEQUAL
             MVI A, FF; ELSE A = TRUE IF
                      ; COMPARISON
                      ; OK.
             RET;       RETURN ANYWAY
                        WRITE
ENTRY POINT: ORA A;    TEST INCOMING VALUE
             RP;        RETURN IF POS.
                      ; I.E.FALSE
             MOV A, L;  ELSE A = STATE
                      ; NUMBER
             MOV L, H;  L = SET NUMBER
             MVI H, 10; HL = 1000H + SET
                      ; NUMBER
             MOV M, A; SET STATE = INCOMING
                      ; STATE NO
             RET;       END
```

2. For use with a "HEWLETT PACKARD 1000" mini-computer it is assumed that the A register will hold the logical value of the STATE, while the register B will hold the STATE and set SELECTION NUMBERS, and also that 256 STATES are possible in each of 16 possible sets.

The program runs as follows:

```
                     READ:
READ NOP;  STORE RETURN ADDRESS
     LDA B;
     AND =B377; A NOW HOLDS STATE NUMBER
     SWP;       B = STATE NO., A HOLDS COMPOSITE
     ALF, ALF;  SET NO. IN LOWEST BITS OF A
     AND =B17;  A NOW = SET NUMBER
     ADA SETO;  A ADDRESS RELEVANT SET STORE
     LDA A,I;   A NOW HOLDS CURRENT STATE NO.
     CMB;       COMPARE WITH INTERROGATING
              ; STATE
     JMP TRUE;  SAME SO TRUE
     CLA;       ELSE PUT A FALSE
JMP READ,I;     AND END
     TRUE CCA;  IF TRUE PUT A TRUE
JMP READ,I;     AND END
                     WRITE
ALLOC NOP; HOLD RETURN ADDRESS
     SSA,RSS;   SKIP IF SIGN BIT SET? I.E.TRUE?
JMP ALLOC,I;    ELSE RETURN NOW
     LDA B;
     AND =B377; A = STATE NO.
     SWF;       B = STATE NO. A = COMPOSITE
     ALF, ALF;  A HAS SET NO. IN LOWEST BITS
     AND =B17;  A HAS SET NO. ONLY
     ADA SETO;  A ADDRESSES RELEVANT SET STORE
     STB A,I;   PUT THIS SET STORE TO NEW STATE
JMP ALLOC,I;    AND RETURN
```

Thus it is seen that direct software implementation of the STATE variable is relatively simple although it does become necessary to call a subroutine in order to read or write a STATE variable, while other variables may be read or written directly in the normal way.

Though such a software implementation of the inventive concept may be used, it will provide processing that is not quite so fast as that provided by the hardware form of implementation described above. When even faster processing is required to deal with the needs of a particular system to be controlled, micro-programming techniques may be used to handle suitable parts of the program.

Where desired a single processor may be arranged to control two or more simultaneously operating processes, in which case there must be one dedicated storage location (60) for each such process; and in such a case the control program for the processor must identify the particular dedicated storage location and the particular set of STATES to be used at any particular instant.

Furthermore, whereas the processor has been described as successively evaluating all of the statements in a set to find the STATE currently having a TRUE value, the control program may be arranged instead to evaluate only those STATES which are closely adjacent to the currently TRUE STATE in the set and to which the system may progress from its current TRUE STATE.

Control systems embodying the present invention have the following principal advantages, when compared with prior art systems.

The control program for the processor has a one-for-one correspondence with the STATE diagram definition of the required control algorithm as produced by the control system engineer. This allows the program to be written more easily, more efficiently, and with a higher degree of assurance that it will correctly perform the required control. Moreover, that control program has the advantage that its logic is very easily checked (validated) by inspection and comparison against the control engineer's STATE diagram for the process.

The complexity of the control program for the process varies directly with the complexity of the STATE diagram of the process to be controlled. This contrasts favourably with that of a control program for a process which program is devised according to the normal prior art technique for controlling a real time process, in which technique for any increase in the complexity of the STATE diagram there is a related disproportionately large increase in the complexity of the control program.

The reduced complexity of the control program for a process according to the present invention leads to substantial reductions in the storage requirement for the program, and in the execution time of the program.

Though the invention has been described in relation to the control of a real time process of an industrial character (furnace temperature control), the invention may also be applied to other systems of controlled technical activity which involve in some way:

(a) the passage of time in which reactions may occur in response to control actions;

(b) the feedback of data defining the behaviour of the system in response to control actions taken earlier or other system disturbances; and (c) the taking of other control actions (whether of a corrective or instigational nature) in response to the data fed back.

Such other control systems may relate, for example, to military systems.

I claim:

1. A method of, controlling an industrial process for which a multiplicity of "operating states" of the process are separately identifiable, each said operating state being a combination of all the control conditions instantaneously prevailing throughout the process, which method comprises the steps of:

(a) representing each one of said multiplicity of said operating states in a control apparatus (30) by a corresponding logical variable of a "set" of such variables, in which set the multiplicity of members of the set is equal to at least the said multiplicity of said operating states;

(b) causing the variables of said set to comply in said apparatus with the rules that:
  (i) one, and only one, member of the set can have the value TRUE at any one time, all others inherently then having the value FALSE;
  (ii) any other member of said set can be required for control of the controlled process be the next succeeding member to take the value TRUE; and
  (iii) no member of said set may take the value FALSE except as a consequence of another member of the set taking the value TRUE;

(c) maintaining a correspondence between said separately identifiable operating states of the process and the logical values of the corresponding members of said set in said control apparatus (30) by detecting from feed back data or otherwise the occurrence of the required conditions appertaining to the change of operating state of the process from one current, operating state to another operating state and accordingly causing the said variable representing the said another operating state to take the value TRUE, the variable representing said one operating state thereupon automatically reverting to the value FALSE; and (d) initiating in said control apparatus any necessary and relevant control action consequent upon the setting to the value TRUE of said logical variable representing said another operating state; and in which method representation of the operation of said process in said control apparatus (30) progresses from the member of said set which is currently TRUE directly to any other member of the set as appropriate upon detecting the occurrence of the required conditions appertaining to the relevant change of operating state of the process.

2. A method according to claim 1, in which the relationships between such logical variables are defined by logical statements of the form $$STATE_{(N)} \text{ AND } OMI_{(N,M)} = STATE_{(M)}$$

where
  N and M may each have any integral value up to P, N does not equal M,
  $STATE_{(N)}$ and $STATE_{(M)}$ are each members of a set of P logical variables of which set one and only one member takes the value TRUE at any given time, which set of P logical variables constitutes the aforesaid set of logical variables, and
  $OMI_{(N,M)}$ is the OPERATING MODE INCREMENT (also a logical variable) which takes the value TRUE if the conditions which allow the process to proceed from an operating state represented by $STATE_{(N)}$ to an operating state represented by $STATE_{(M)}$ are detected from said feedback data or otherwise;

which method also includes the step of causing a digital data processor (54) incorporated in said control apparatus to successively evaluate each of said logical statements, or a relevant group of said logical statements, and determine from such evaluation when the STATE last found to have the value TRUE is superseded by another of said STATES newly found to have said value TRUE, and to provide output control signals (at 44–50) in response to such a finding for initiating any such necessary and relevant control action.

3. A method according to claim 2, wherein the said rule (i) above of said set of logical variables is realised by (a) storing the identity of the STATE most recently found to have the value TRUE, (b) evaluating any STATE in the set by making a comparison of the identity of that STATE with the identity stored, and (c) allocating the value TRUE to that STATE if the two identities are the same, but the FALSE value otherwise.

4. A method according to claim 3, wherein the identity of each STATE is represented by an address (at 62A) in an hypothetical storage unit in which every member of said set is deemed to be stored.

5. A method according to claim 3, which method includes the steps of:
  (i) evaluating in turn in accordance with a relevant logical statement each successive STATE in at least a group of such STATES in said set on the basis of said feedback data relating to current values of various relevant parameters of the process (or otherwise) and the current TRUE STATE, by
    (a) determining the logical value of the or each preceding STATE on which said STATE is dependent,
    (b) determining from said feedback data (or otherwise) the logical value of the or each OPERATING MODE INCREMENT on which said STATE is dependent, and
    (c) evaluating the logical statement defining said STATE, using the logical values just determined for the or each preceding STATE and the associated OPERATING MODE INCREMENT to determine the logical value of said STATE; and
  (ii) providing said output control signals on finding a STATE having the logical value TRUE.

6. A method according to claim 5, wherein the identity of each STATE is represented by a storage location address allocated to that STATE.

7. A method according to claim 6, wherein said storage location address is an address (at 62A) of an hypothetical storage location in an hypothetical storage unit, or in an hypothetical extension of a storage unit (56) used for the ordinary data processing functions of the system.

8. A method according to claim 3, which method includes the steps of:
  (i) storing the identity of the STATE currently having (i.e. most recently found to have) the logical value TRUE;
  (ii) evaluating in turn, in accordance with a relevant logical statement, each successive STATE in at least a group of such STATES in said set on the basis of said feedback data relating to current values of various relevant parameters of the process (or otherwise) and of said stored TRUE STATE identity, by
    (a) determining the logical value of the or each preceding STATE on which said STATE is dependent,
    (b) determining from said feedback data (or otherwise) the logical value of the or each OPERAT- ING MODE INCREMENT on which said STATE is dependent, and (c) evaluating the logical statement defining said STATE, using the logical values just determined for the or each preceding STATE and the associated OPERATING MODE INCREMENT to determine the logical value of said STATE;

(iii) storing in place of said stored STATE identity the identity of a STATE just found in (c) above to have the logical value TRUE; and (iv) providing said output control signals on finding a STATE having the logical value TRUE.

9. A method according to claim 8, wherein the said step (ii) (a) is performed by making a comparison of the identity of each such preceding STATE with the stored STATE identity.

10. A method according to claim 9, wherein the identity of each STATE is represented by a storage location address allocated to that STATE.

11. A method according to claim 10, wherein said storage location address is an address (at 62A) of an hypothetical storage location in an hypothetical storage unit, or in an hypothetical extension of a storage unit (56) used for the ordinary data processing functions of the system.

12. A method according to claim 8, wherein the identity of the STATE currently having the TRUE value is stored in a dedicated storage location (60) which is connected to supply one input circuit of a comparator (66), and wherein said step (ii) (a) above is performed by activating that storage location (60) and simultaneously supplying to a second input circuit of said comparator (66) the identity of a STATE currently being determined in said step (ii) (a), thereby causing the comparator (66) to supply a TRUE or FALSE output signal according to the equality or inequality of the compared STATE identities, whereby to indicate the logical value of the STATE currently being determined.

13. A method according to claim 12, including the step, upon evaluating in said step (ii) (c) said logical statement to determine the logical value of said STATE, and finding said STATE to have said logical value TRUE, of supplying the identity of said TRUE STATE to said dedicated storage location (60) for storage therein in place of the previously stored STATE identity.

14. A control apparatus for which a multiplicity of "operating states" of the process are separately identifiable, each said operating state being a combination of all the control conditions instantaneously prevailing throughout the process for controlling an industrial process, which apparatus comprises:

(a) means for representing (in 56) each one of said multiplicity of said operating states by a corresponding logical variable of a "set" of such variables, in which set the multiplicity of members of the set is equal to at least the said multiplicity of said operating states, said means being constructed and arranged such that the variables of said set comply with the rules that:

(i) one, and only one, member of the set can have the value TRUE at any one time, all others inherently then having the value FALSE;

(ii) any other member of said set can as required for control of the controlled process be the next succeeding member to take the value TRUE; and (iii) no member of said set may take the value FALSE except as a consequence of another member of the set taking the value TRUE;

(b) means for maintaining (in 52) a correspondence between said separately identifiable operating states of the process and the logical values of the corresponding members of said set by detecting, from current value data relating to various relevant parameters of the controlled process as provided by respective feedback devices (32, 38; 34, 40; 36, 42)—or otherwise, the occurrence of the required conditions appertaining to the change of operating state of the process from one current operating state to another operating state and accordingly causing the said variable representing the said another operating state in said representing means to take the value TRUE, whereupon the variable representing said one operating state in said representing means automatically reverts to the value FALSE; and (c) means (54, 44-60) responsive to a said variable newly taking the value TRUE for providing in response thereto output control signals for initiating any necessary and relevant control action by said control apparatus (30) consequent upon setting to the value TRUE said logical variable representing said another operating state; and in which apparatus representation of the operation of said process in said representing means progresses from the member of said set which is currently TRUE directly to any other member of the set as appropriate upon detecting the occurrence of the required conditions appertaining to the relevant change of operating state of the process.

15. An apparatus according to claim 14, wherein said means (a) (b) and (c) above comprise a digital data processor (54) constructed and arranged to process as required a set of logical statements of the form $$STATE_{(N)} \text{ AND } OMI_{(N,M)} = STATE_{(M)}$$

where
N and M may each have any integral value up to P,
N does not equal M,
$STATE_{(N)}$ and $STATE_{(M)}$ are each members of a set of P logical variables of which set one and only one member takes the value TRUE at any given time, which set of P logical variables constitutes the aforesaid set of logical variables, and
$OMI_{(N,M)}$ is the OPERATING MODE INCREMENT (also a logical variable) which takes the value TRUE if the conditions which allow the process to proceed from an operating state represented by $STATE_{(N)}$ to an operating state represented by $STATE_{(M)}$ are detected from said feedback data, or otherwise; said digital processor (54) having means for causing it to successively evaluate each of said logical statements, or a relevant group of said logical statements, and determine from such evaluation when the STATE last found to have the value TRUE is superseded by another of said STATES newly found to have said value TRUE, to provide said data processor being arranged said output control signals (at 44-50) in response to such a finding for initiating any such necessary and relevant control action.

16. An apparatus according to claim 15, wherein said data processor includes, for realising said rule (i) above, (a) means for storing (60) the identity of the STATE most recently found to have the value TRUE, which storage means is referred to hereafter as "said storage device", (b) means for evaluating (54, 60, 66) any STATE in the set by making a comparison of the identity of that STATE with the identity stored in said storage device, and (c) means for allocating (68, 70) the value TRUE to that STATE if the two identities are the same, but the FALSE value otherwise.

17. An apparatus, according to claim 16, wherein the identity of each STATE is represented by an address (at 62A) in an hypothetical storage unit in which every member of said set is deemed to be stored.

18. An apparatus according to claim 16, wherein said data processor includes:
   (i) evaluating means (54, 60, 66–70) constructed and arranged to determine on the basis of the stored current TRUE STATE and said feedback data, the logical value of a STATE and an OPERATING MODE INCREMENT and from those logical values and a relevant logical statement, the logical value of another STATE in the set; and to subsequently repeat the above determination process for each successive next STATE in at least a group of such STATES; and
   (ii) means (54, 44–50) responsive to a determination that a STATE has the TRUE value for providing thereupon said control signals for initiating any relevant and necessary control action appropriate to that TRUE value STATE, and signals for updating the identity of the STATE stored in said storage device.

19. An apparatus according to claim 18, wherein the identity of a STATE is represented by a storage location address (at 62A) allocated to that STATE.

20. An apparatus according to claim 19, wherein said storage location address is an address (at 62A) of an hypothetical storage location in an hypothetical storage unit, or in an hypothetical extension of a storage unit (56) used for the ordinary data processing functions of the control apparatus (30).

21. An apparatus according to claim 18, wherein said data processor comprises a micro-processor (54) constructed and arranged to operate in conjunction with an addressable storage unit (56), said micro-processor being provided with a multiplicity of address lines (62) for addressing the respective storage locations (58) of that unit (56), and wherein a first group (62B) of said address lines is used to address a single dedicated storage location (60) of that unit, which location constitutes said storage device (60), and a second group (62A) of said address lines is used to supply the identity of each successive STATE to a comparator (66) for comparison in turn therein with the STATE identity stored in and received from said dedicated storage location (60), said comparator (66) having output circuit means (68, 70) for indicating the logical value of a STATE identified by said second group (62A) of address lines.

* * * * *